United States Patent
Reid et al.

[11] Patent Number: 5,892,449
[45] Date of Patent: Apr. 6, 1999

[54] ELECTRICAL DISTRIBUTION SYSTEM WITH AN EXTERNAL MULTIPLE INPUT AND STATUS UNIT

[75] Inventors: Drew A. Reid, Brentwood, Tenn.; Kon Wong, Cedar Rapids, Iowa; Robert C. Ditmore, Murfreesboro; Fredric I. Graham, Nashville, both of Tenn.

[73] Assignee: Square D Company, Palatine, Ill.

[21] Appl. No.: 884,568

[22] Filed: Jun. 27, 1997

Related U.S. Application Data

[63] Continuation of Ser. No. 378,326, Jan. 26, 1995, abandoned, which is a continuation-in-part of Ser. No. 723,474, Jun. 28, 1991.

[51] Int. Cl.$^6$ .................................................. G08B 21/00
[52] U.S. Cl. ........................ 340/639; 340/638; 324/424; 361/93
[58] Field of Search .................................... 340/638, 639, 340/524, 525, 825.06, 825.16, 825.17, 825.18; 335/17; 364/483; 324/424; 361/93–97

[56] References Cited

U.S. PATENT DOCUMENTS

| | | | |
|---|---|---|---|
| 3,529,292 | 9/1970 | Neill et al. | 340/638 |
| 3,949,277 | 4/1976 | Yosset | 361/686 |
| 4,213,182 | 7/1980 | Eichelberger et al. | 364/528.31 |
| 4,217,646 | 8/1980 | Caltagirone et al. | 364/528.31 |
| 4,293,915 | 10/1981 | Carpenter et al. | 364/528.31 |
| 4,466,074 | 8/1984 | Jindrick et al. | 702/176 |
| 4,467,260 | 8/1984 | Mallick, Jr. et al. | 318/800 |
| 4,467,434 | 8/1984 | Hurley et al. | 364/528.3 |
| 4,484,258 | 11/1984 | Miller et al. | 364/141 |
| 4,535,409 | 8/1985 | Jindrick et al. | 364/528.28 |
| 4,571,586 | 2/1986 | Right | 340/517 |
| 4,623,859 | 11/1986 | Erickson et al. | 335/14 |
| 4,628,397 | 12/1986 | Gareis et al. | 361/98 |
| 4,663,539 | 5/1987 | Sharp et al. | 307/38 |
| 4,701,858 | 10/1987 | Stokes et al. | 702/58 |
| 4,751,581 | 6/1988 | Ishiguro et al. | 348/734 |
| 4,754,162 | 6/1988 | Kondou et al. | 307/112 |
| 4,769,765 | 9/1988 | Green | 364/145 |
| 4,777,607 | 10/1988 | Maury et al. | 307/86 |
| 4,783,718 | 11/1988 | Raabe et al. | 361/652 |
| 4,920,476 | 4/1990 | Brodsky et al. | 361/96 |
| 4,922,407 | 5/1990 | Birk et al. | 364/145 |
| 4,937,706 | 6/1990 | Schueller et al. | 361/744 |
| 4,964,058 | 10/1990 | Brown, Jr. | 364/923 |
| 4,965,694 | 10/1990 | Dvorak et al. | 361/64 |
| 4,978,911 | 12/1990 | Perry et al. | 324/142 |
| 4,996,646 | 2/1991 | Farrington | 340/657 |
| 5,051,861 | 9/1991 | Purkayastha et al. | 361/96 |
| 5,164,875 | 11/1992 | Haun et al. | 361/64 |
| 5,184,278 | 2/1993 | Jordon et al. | 361/627 |
| 5,233,511 | 8/1993 | Bilas et al. | 364/146 |

Primary Examiner—Edward Lefkowitz
Attorney, Agent, or Firm—Larry I. Golden; Kareem M. Irfan

[57] ABSTRACT

An electrical distribution system having a load center for programmably and remotely controlling a plurality of circuit breakers, an expander unit coupled to the load center and a plurality of external switches for providing signals to the load center representative of the status of the switches. The load center contains a control module that continually receives inputs from the expander unit via an interface module. It also contains a keyboard and display for programming instructions for closing and opening the individual circuit breakers and for displaying the status of the circuit breakers. The interface module, coupled to the control module, causes the circuit breakers to open and close according to programmed instructions received from the control module or another external device. The expander unit contains a plurality of input circuits coupled to external switches. An expander circuit having a microprocessor receives signals from the input circuits, which are representative of the status of the external switches, and continually provides signals representative of the status of the switches to the load center for the load center to cause the circuit breakers to open and close as a function of the status of the external switches. The expander circuit also continually receives information from the load center about the status of the individual circuit breakers and provides, to a plurality of output terminals, signals representative of the status of the circuit breakers. The output terminals are coupled to a display device for displaying the status of individual circuit breakers. The output terminal also may be used to activate other devices.

20 Claims, 6 Drawing Sheets

ELECTRICAL DISTRIBUTION SYSTEM WITH AN EXTERNAL MULTIPLE INPUT AND STATUS UNIT

CROSS-REFERENCE TO RELATED APPLICATION

This is a continuation of application Ser. No. 08/378,326 filed on Jan. 26, 1995, now abandoned which is a continuation in part of U.S. application Ser. No. 07/723,474, filed on June 28, 1991.

BACKGROUND OF THE INVENTION

1. Field of the Invention

The present invention relates generally to circuit breakers and more particularly to improvements in the control and monitoring of remotely controlled circuit breakers.

2. Descriptions of the Related Art

Remotely controlled circuit breakers are commonly used for temporary interruption of electrical power to electrical devices during peak use hours and for programmable control. of lighting and other devices in commercial applications. By selectively opening and closing from remote locations, such circuit breakers can provide energy savings and convenience of operations over manually operated circuit breakers. For these reasons, remotely controlled circuit breakers are increasingly being used in various industries and office buildings alike.

Remotely controlled circuit breaker systems typically include a circuit breaker load-center having circuit breakers wired to a remotely located control unit, such as a computer, for monitoring and/or controlling the individual circuit breakers. U.S. Pat. No. 4,920,476 issued to Brodsky et al. on Apr. 24, 1990, shows a circuit breaker system wherein the wiring is accomplished by using a patch-board within the load-center. Other systems use hard-wiring between each circuit breaker input/output and a terminal in the remotely located computer. Such systems are not flexible, in that each time the circuit breaker control requirements change, the wiring and many system components must be reconfigured or replaced, which can be expensive and burdensome.

The parent co-pending patent application U.S. Ser. No. 07/723,474, filed on Jun. 28, 1991 and assigned to the assignee of this application, provides an electrical power distribution system which solves the above-noted problems. It includes multiple circuit breakers, each of which is operable by remote control in at least an open and a closed position. A circuit breaker control circuit having a termination circuit interprets circuit breaker control signals from an external switch device. A circuit breaker driver board controls and monitors the circuit breaker input means. Data paths are provided for receiving programming data from an external device. A switch input data path coupled to the termination circuit carries circuit breakers switching instructions from the termination circuit. The control circuit responds to manual input instructions, programming data and circuit breaker switch instructions according to a prioritization scheme. The parent patent application U.S. Ser. No. 07/723,474, filed on Jun. 28, 1991, is incorporated herein by reference.

The above described circuit breaker system is enclosed in a single panel, which has a limited capability to accept inputs from various external switches or devices, which in many applications significantly reduces the capability of such circuit breaker systems. Additionally, no means are provided to remotely display the status of individual circuit breakers or to operate other devices as a function of the status of the individual circuit breakers.

The present invention provides an electrical distribution system having the above described circuit breaker unit or the load panel and an expander unit. The expander unit enables the circuit breaker unit to utilize a large number of inputs from various external switches and/or devices. The expander unit also displays the status of the individual circuit breakers at a remote location and is adapted to drive or operate other devices as a function of the status of the individual circuit breakers.

SUMMARY OF THE INVENTION

The present invention provides an electrical distribution system having a circuit breaker unit or a load panel for programmably and remotely controlling a plurality of circuit breakers and an expander unit coupled to the load center for continually providing a plurality of inputs to the load center that are representative of the status of a plurality of switches or other devices and for receiving signals representative of the status of the individual circuit breakers from the load center and displaying such status on a display means at a remote location. The expansion unit also is adapted to drive electrical devices as a function of the status of the circuit breakers.

The load center contains a control module that continually receives inputs from the expander unit via an interface module. It also contains a display and programming panel for programming instructions for closing and opening the individual circuit breakers. The interface module, coupled to the control module, causes the circuit breakers. to open and close according to the programmed instructions received from the control module or another remote control means.

The expander unit contains a plurality of input terminal and a plurality of output terminals. The input terminals are coupled to external switches or other devices based upon whose status the circuit breakers will be opened or closed. An expander circuit having a microprocessor receives signals from the input terminals, which are representative of the status of the external switches, and continually communicates such information to the load center. The expander circuit also continually receives the information from the load center about the status of the individual circuit breakers and provides signals to the output terminals representative of the status of the circuit breakers. The output terminals are coupled to display means for displaying the status of individual circuit breakers. The output terminal also may used to activate other devices.

Examples of the more important features of the invention thus have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

The electrical distribution system according to the present invention contains two parts: a load center or circuit breaker unit and an expander unit. FIGS. 1–4 relate to the circuit breaker unit and FIGS. 5 and 6 relate to the expander unit. In the discussion that follows, the functions and operations of the circuit breaker unit are described first and then the functions and operations of the expander unit are described.

Figure 1:
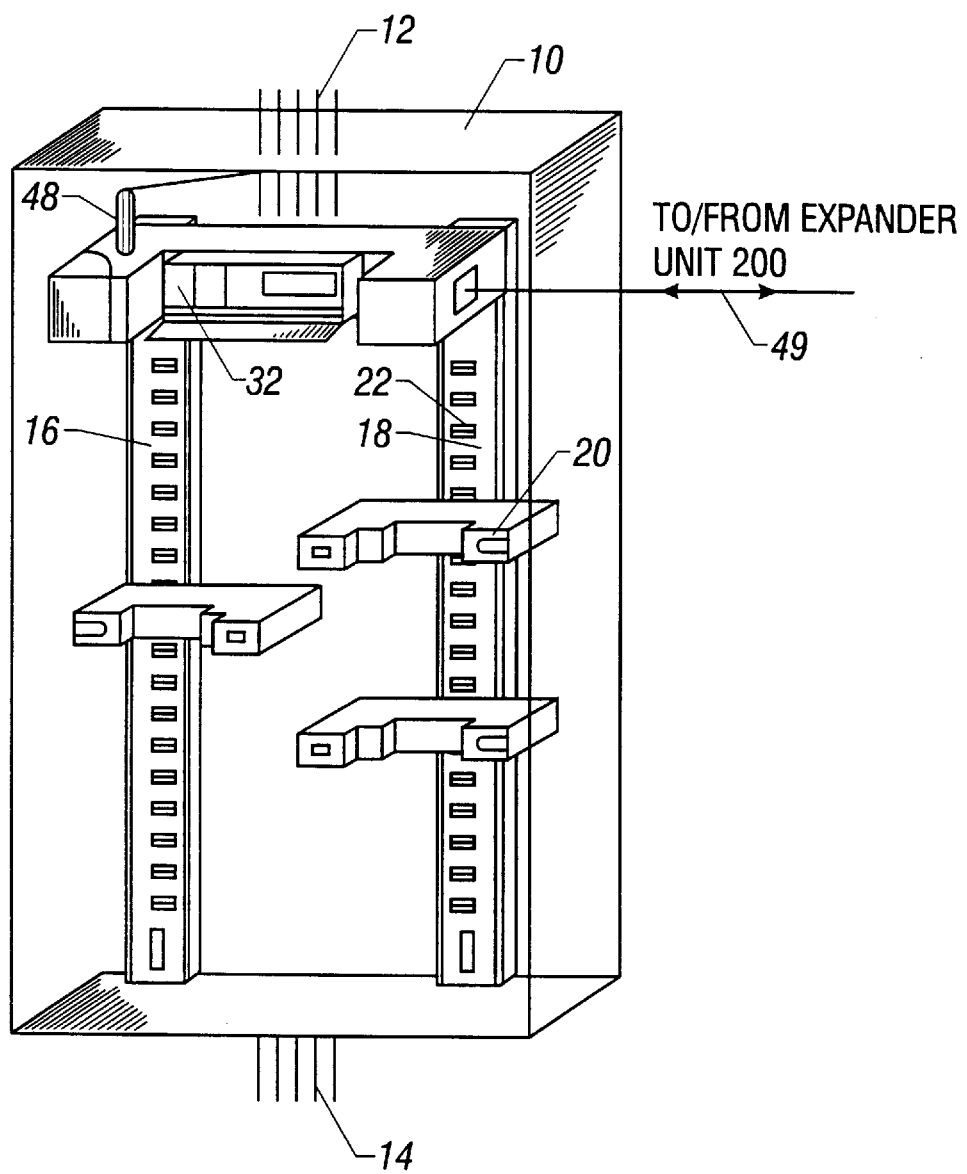
FIG. 1 shows a perspective view of a circuit breaker unit according to the present invention.

FIG. 1 shows a perspective view of a circuit breaker unit 15 having multiple remotely controllable circuit breakers 20 and circuitry contained in a control module 32 and an interface module 24 to remotely and programmably control the closing and opening of the individual circuit breakers 20. The circuit breaker unit 15 is coupled to an external expander unit (FIG. 5) by a link 49, preferably via an "RS-232" port. The circuit breaker unit 15 contains a panel board or load center enclosure 10 which has a plurality of input power lines 12 coupled to a power source (not shown). A plurality of electrical lines or conductors 14 exit the enclosure 10, which are coupled to their associated loads, such as lights or other electrical devices. Bus boards 16 and 18, which may be implemented on the same board, are disposed in parallel on each side of the load center for mounting thereon circuit breakers 20. At least some of the circuit breakers are adapted to be remotely controlled while the remaining circuit breakers may be only manually operable.

A preferred circuit breaker that may be used as a remotely controlled circuit breaker 20 in the present invention is described in U.S. patent application Ser. No. 07/422,050, entitled "Remote Control Circuit Breakers", assigned to assignee of this application, which is incorporated herein by reference. Another circuit breaker that may be used to implement a remotely controlled circuit breaker 20 in the present invention is described in U.S. Pat. No. 4,623,859, issued to Erickson et al., assigned to assignee of this application, which is incorporated herein by reference.

Each circuit breaker 20 has a plug-in socket that mates or couples to one of a plurality of connectors 22 on the bus boards 16 and 18. The connectors 22 are used on the bus boards 16 and 18 to carry motor control and contact status signals, via the interface module 24, to and from the circuit breakers 20. Electrical switching devices, such as contactors or electrical relays, may also be used in place of circuit breakers 20.

Figure 2:
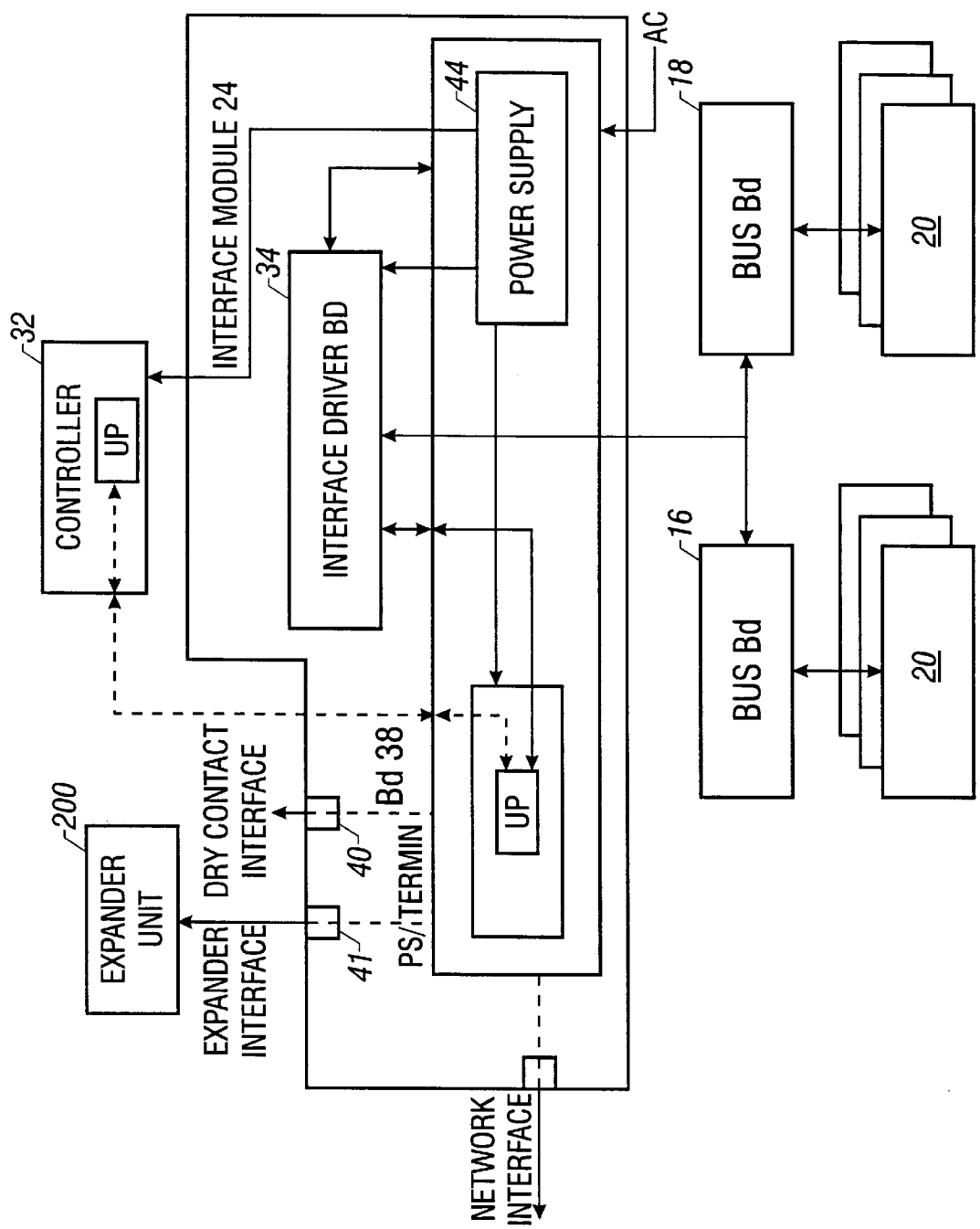
FIG. 2 shows a block diagram of the system shown in FIG. 1, coupled to an expander unit.

FIG. 2. shows a block diagram of the interface module 24 of the circuit breaker unit 15 and its interconnection with an expander unit 200, controller 32 and circuit breakers 20. The interface module 24 interprets messages from the controller 32 and facilitates the control and monitoring functions from both local and remote locations. Both the control and monitoring functions are accommodated within the interface module 24 using an interface driver board 34. The interface driver board 34 provides a communications path between the circuit breakers 20 and the controller 32, which resides within and as an integral part of the load-center enclosure 10. The controller 32 may communicate with a remotely located control/monitoring device, such as a computer, via a termination board 38. Any control or monitoring signal transmitted between the interface driver board 34 and the circuit breakers is carried by one of two control buses on the bus boards 16 and 18.

The termination board 38 is used to couple the control and monitoring signals between the interface driver board 34 and any remotely located control/monitoring device via the controller 32. Preferably, the control and monitoring signals are transmitted and received using either a direct-wiring (or dry contact) interface, as depicted at port 40. This coupling may also be accomplished using a number of different techniques, including, for example, those techniques discussed in U.S. Pat. No. 4,709,339 (issued to Fernandez), and U.S. Pat. No. 07/503,267, issued to Wallis.

Figure 3:
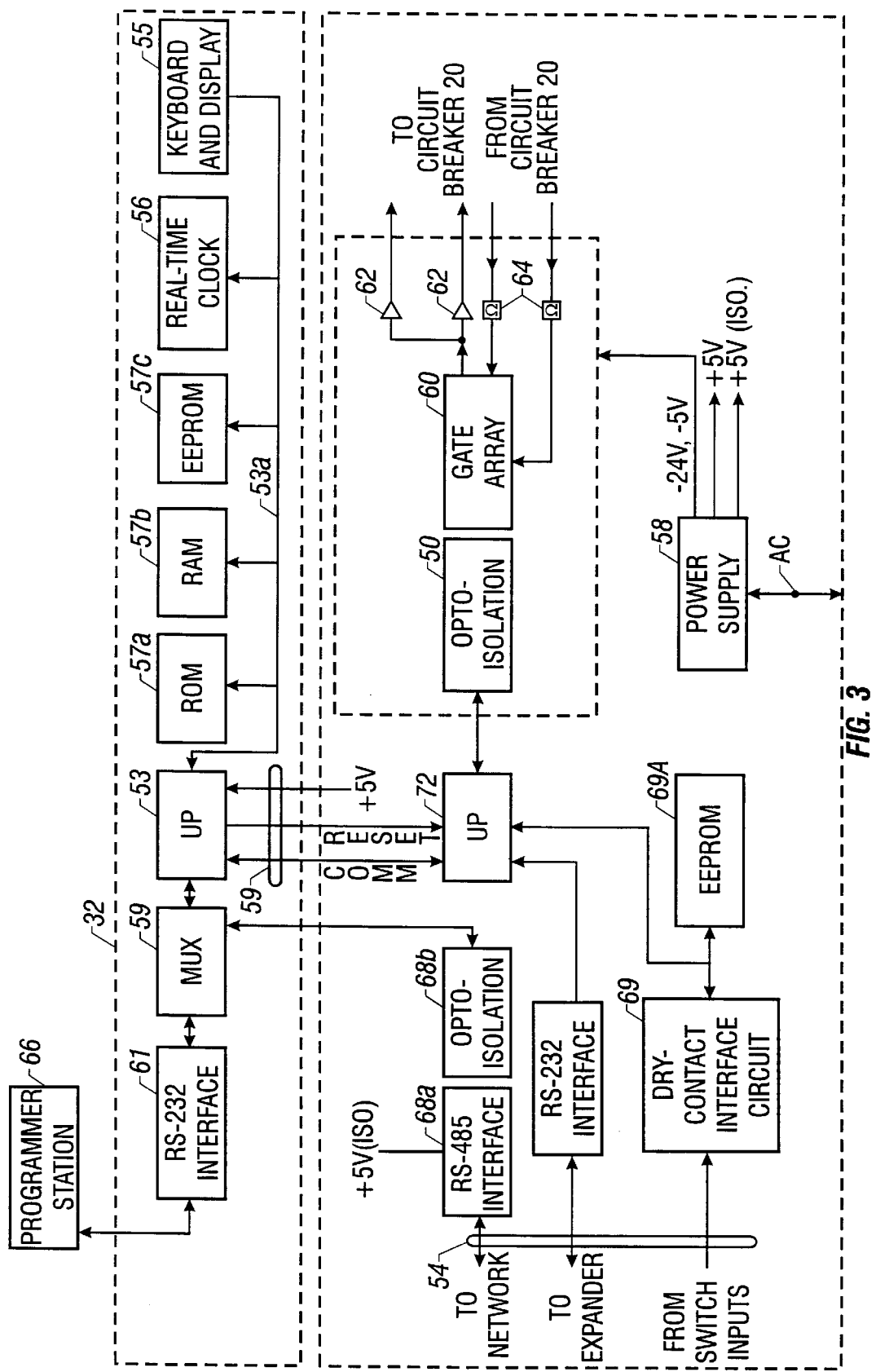
FIG. 3 Shows a more specific block diagram of the controller, interface module and the termination board contained in the system shown in FIG. 1.

FIG. 3 shows an electrical block diagram of the controller 32 and the interface module 24. The controller 32 includes a microcomputer 53, preferably an 80C31 or 80C32 type available from Intel Corporation, which communicates with a keyboard and display 55 via a bus 53a. The user or operator is provided complete control over, and status of, the circuit breakers 20 through the keyboard and display panel 55.

The controller 32 includes memory means 57, which includes a Read Only Memory (ROM") 57a for permanently storing programmed instructions therein, a Random Access Memory (RAM) 57b in which information may temporarily be stored and retrieved, and an Electrically Erasable Programmable Read Only Memory ("EEPROM") 57c for erasably storing certain programmed instructions. The memory 57 is programmed by the user to contain specific information for operating each of the system's circuit breakers 20. Preferably, the memory 57 does not store the present state of the circuit breakers, since their state may be regularly. accessed from the circuit breakers 20 themselves. However, a history of the circuit breaker activity may be recorded in the memory 57 for maintenance purposes.

In order to prevent memory endurance problems from limiting the life of the system, writes to the memory 57 are limited. Variable data is stored in the RAM as long as possible before any writes to the memory 57 are performed. Data is only written to the memory 57 at prescribed times during the programming mode of the controller 32. During the system run mode, data is not written to the memory 57 so as to prolong the life of the memory.

The interface driver board 34 is shown as interfacing with a microcomputer 72 through an optical isolator 50 to maintain voltage isolation between the circuits and protect the circuits from power-line transients. A data multiplexer 59 provides electronic programming capabilities from a programming computer or station 66 for accessing the controller functions. This is preferably accomplished using serial interface circuitry 61, e.g., for an RS-232 type protocol, between the data multiplexer 59 and a programmer station 66. The interface driver board 34 and the controller 32 may be coupled in this manner using a serial protocol to reduce the number of pins required for communication therebetween.

The interface driver board 34 further includes a gate array 60 which couples the interface driver board 34 through amplifiers 62 to the motors of the remotely controlled circuit breakers 20 in order to significantly reduce the number of required driver transistors and printed circuit board traces. When the interface driver circuitry is commanded to engage a breaker (i.e., open or close the breaker contacts), the gate array 60 essentially maps the address of the circuit breaker into a form which will turn on any two of a plurality of power output transistors associated with the gate array 60. Timers within the gate array 60 drive power transistors 62 external to the gate array 60 to control the circuit breaker motor engagement time and status read times. For example, a pair of power transistors may drive the circuit breaker motor in either of two directions for a controlled time period in order to turn the circuit breaker on or off by closing or opening the contacts of the circuit breakers 20. After the motor drive time period elapses, the status of the selected circuit breaker is automatically read after a specified settle time and is passed to the communications circuitry of the gate array 60. Only one circuit breaker is switched at a time, and sets of breakers are turned on or off sequentially.

Because of the limited physical space available for the power driver circuitry of the gate array 60, a minimum circuit breaker cycle time, i.e., the time. period to complete the tasks and communications associated with a single command, is observed. This cycle time allows the power supply 58 to sufficiently recharge the power supply storage capacitors (which may be located at the input of the −24 Volt regulator) to supply full voltage to the circuit breaker motors.

The status signals provided by the selected circuit breaker 20 are filtered by noise filters 64 before being provided to the gate array 60, which transmits the circuit breaker status to the controller 32 through the optical isolator 50.

In addition to controlling and monitoring the circuit breakers 20 from the keyboard and display 55, the circuit breakers 20 may be accessed using the microcomputer 53 of the controller 32. For such communication with the controller 32, the termination board 38 includes a microcomputer 72 to communicate directly with the microcomputer 53. A significant advantage of this arrangement is that it allows a multitude of remote devices to control and monitor the circuit breakers 20 in the same manner as with the keyboard and display panel 55.

The termination board 38 includes a communication or input terminal port 54. The communication port 54 is coupled to an external network via an optical isolator 68b and a communication port 68a, such as an RS-485 interface. The expander 200 (FIG. 5) is coupled to the interface module 24 through the communication port 54 via an RS-232 port, which port also may be used to program the circuit breaker unit 15.

The interface module 24 controls all of the circuit breaker activities. In this manner the controller 32 may be used as an optional element, which may be desirable in many applications, especially when programming is done from remote location. The controller 32 is required when it is desired to open and close the circuit breakers 20 based on time of the day or for network operations. The microprocessor 72 of the interface module 24 initiates all communications to the gate array 60 by sending a two byte message, which minimizes communications protocol errors. The first byte of the two transmitted bytes is equivalent for communications either to or from the interface driver board 34 or microprocessor 72. A byte number is placed in the least significant bit position of all transmitted bytes to reduce the chance of unsynchronized messages. Accordingly, bit zero of the first byte always has a value of zero because it indicates the byte number. Bits one through four indicate the circuit breaker address and are the least significant bits of a particular circuit breaker address. Bits five through seven are check bits which are generated to check bits one through four. The format for the second byte of a message differs depending on whether it is sent from the interface driver board 34 or the microprocessor 72. Messages sent from the microprocessor 72 are command bytes. In the second command byte, bit zero is always one because it signifies byte two of the message. Bits one and two are the most significant two bits of the circuit breaker address. Bits five through seven are generated to check bits one through four. Bits three and four are encoded with four possible commands to the interface driver board 34. The interface module commands are to read the motor, read the contact status, open a selected breaker or close a selected breaker. When the most significant bit of the command code is a zero, the interface driver board 34 only sends back a status. If the most significant of the two bits is a one, a switch command is sent to the interface driver board 34.

Messages sent from the interface driver board 34 are status bytes. The second byte of a status message may differ from the second byte of a command message in bit positions three and four. In a status byte, bit four is a status and bit three is always zero. These bits indicate the presence of a motor in the circuit breaker, the status of the contact, i.e., whether a selected breaker has been opened or closed.

If the interface driver board 34 detects an error in either byte one or byte two, no circuit breaker switching or status reading occurs. An all 1's error message is returned and the gate array 60 is reset to wait for the first byte of the next command. The microprocessor 72 then retransmits the previous message. Accordingly, if the microprocessor 72 sends a read status message, the interface driver board 34 reads the circuit breaker status and returns the results to the microprocessor. If the microprocessor 72 message is a switch command, the interface driver board 34 carries out the command by switching the breaker. It then reads and returns the contact status of the selected breaker. The interface driver board response to a read status message is the desired status of the contacts of the selected circuit breaker. The interface module response to a switch command is the actual status of the contact after the switch has occurred. The microprocessor 72 uses the returned information to ascertain whether the selected circuit breaker has switched. If the returned status shows that the contacts are in the wrong state, the microprocessor 72 may be programmed to attempt to correct the problem.

A seven bit cyclic hamming code detects errors in the most significant seven bits of a message byte. The byte number bit is excluded because there is no available hamming code which will detect seven bits with three check bits. The exclusion is insignificant since parity detects any odd bit error in any bit position. If a two bit error occurs in any message byte which includes bit zero, the hamming code will detect it because the other seven bits of the byte are checked by the code. If a controller command is retransmitted multiple times and an unexpected status is received from the gate array 60, the controller 32 may be programmed to display the error and may then discontinue transmitting the command thereby assuming that the circuit breaker has failed.

Figure 4:
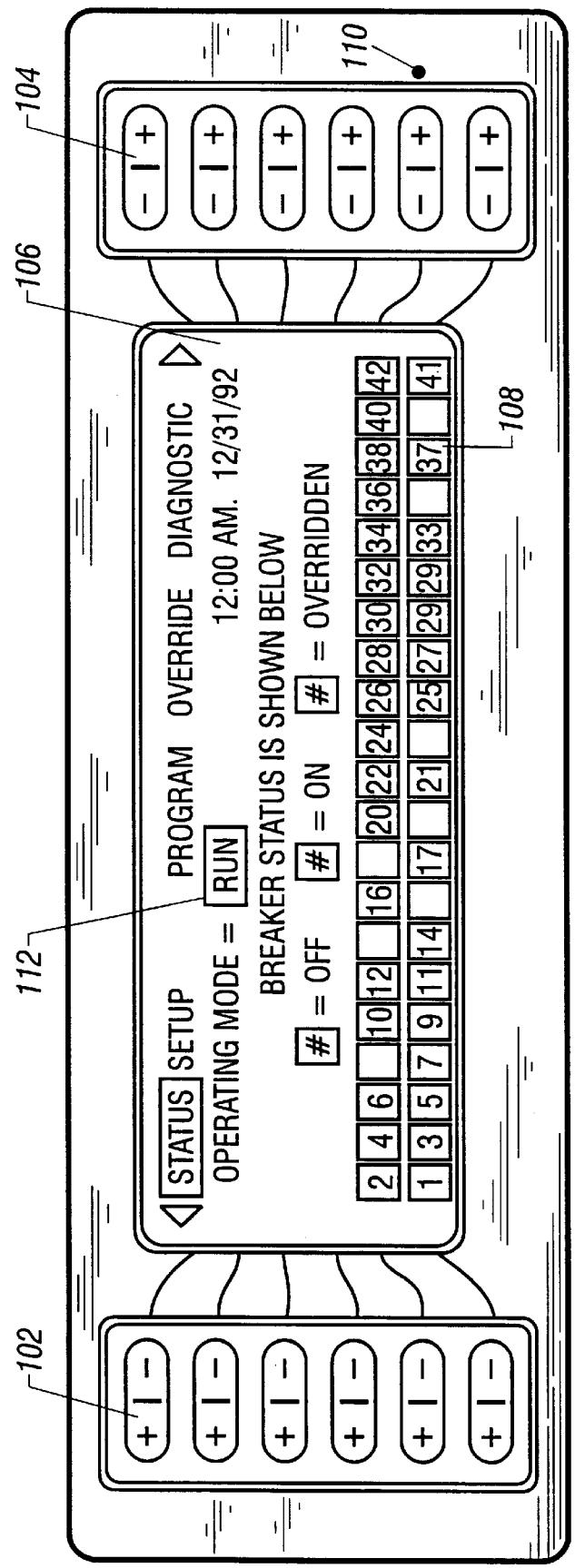
FIG. 4 shows a display panel for use with the controller module.

FIG. 4 shows a keyboard and display panel 55 according to the present invention, which is preferably implemented as the front panel of a housing that encloses the controller 32. The system status and program information are displayed on a Liquid Crystal (LCD) display 106, while the system configuration and programming are performed using a plurality of selection switches 102 and 104 (each having two positions ("+" and "−")) respectively placed on either side of the display 106. A manual reset button 110 is provided, which may be used to reset the system. The display 106 is adapted to display the status of each of the circuit breakers 20, which may be close, open or override. FIG. 4 shows means to display status of 42 circuit breakers, which are labeled 1–42. A dark background with a light numeral, such as shown by numeral 2, preferably indicates that the particular circuit breaker is open (off). A light background with a dark numeral, such as shown by numeral 6, indicates that the particular circuit breaker is closed (on), and a flashing numeral indicates that the automatic control of that circuit breaker has been overridden according to programmed instructions. The system may also be programmed to override the circuit breakers as a function of a safety mechanism contained within the circuit breaker unit 15, such as the opening of the circuit breaker contacts if there is excessive current discharge through the circuit breaker. Multiple circuit breakers used as a single circuit breaker in the system are shown by connected boxes, such a shown by boxes 17 on the display 106.

The circuit breaker unit 15 may be programmed using the display 106 and the selection switches 102 and 104 as discussed earlier. The system also maybe programmed by an external programmer station 66 (FIG. 3). The programming using keyboard and display 55 maybe performed while it is installed on the panel board of the system 15 or from a remote location by linking it to the circuit breaker unit 15 via an appropriate communication link (not shown).

Typically, circuit breakers 20 are turned on or off based on an event. Events may be programmed in the system (automatic control), such as time of day, or signalled by an input change, such as an input from the expander 200 (FIG. 5), which maybe when a switch coupled to an expander input is moved from on to off or vice versa. The controller 32 sends output signals via the interface module 24 to the circuit breakers, turning them on or off, based on the programmed instructions.

During operation, the system may operate under any of three modes: run; manual; and hold. FIG. 4 shows the system in the run mode 112. When the system is operating in any of the other modes, location 112 on the display 106 will display such a mode. During the run mode, the circuit breaker unit 15 responds automatically to events. All system features operate or function as desired in the run mode. In the manual mode, all circuit breakers 20 are typically turned on and events are logged and the outputs updated when the mode returns to the run mode. During the hold mode, the control signals are not processed, the circuit breakers 20 remain in their existing state, but the events are logged and the outputs updated when the mode returns to the run mode. Local programming via the keyboard and display 55 or remote programming via a network may still be done in any of the modes.

FIG. 4 shows the status of the circuit breakers and thus displays "status", as shown in location 113 of the display 106. The status screen is the default screen whenever the system is active. When it is desired, the keyboard may be used to change the display to access additional information categorized as: set-up, program, override and diagnostic.

Figure 5:
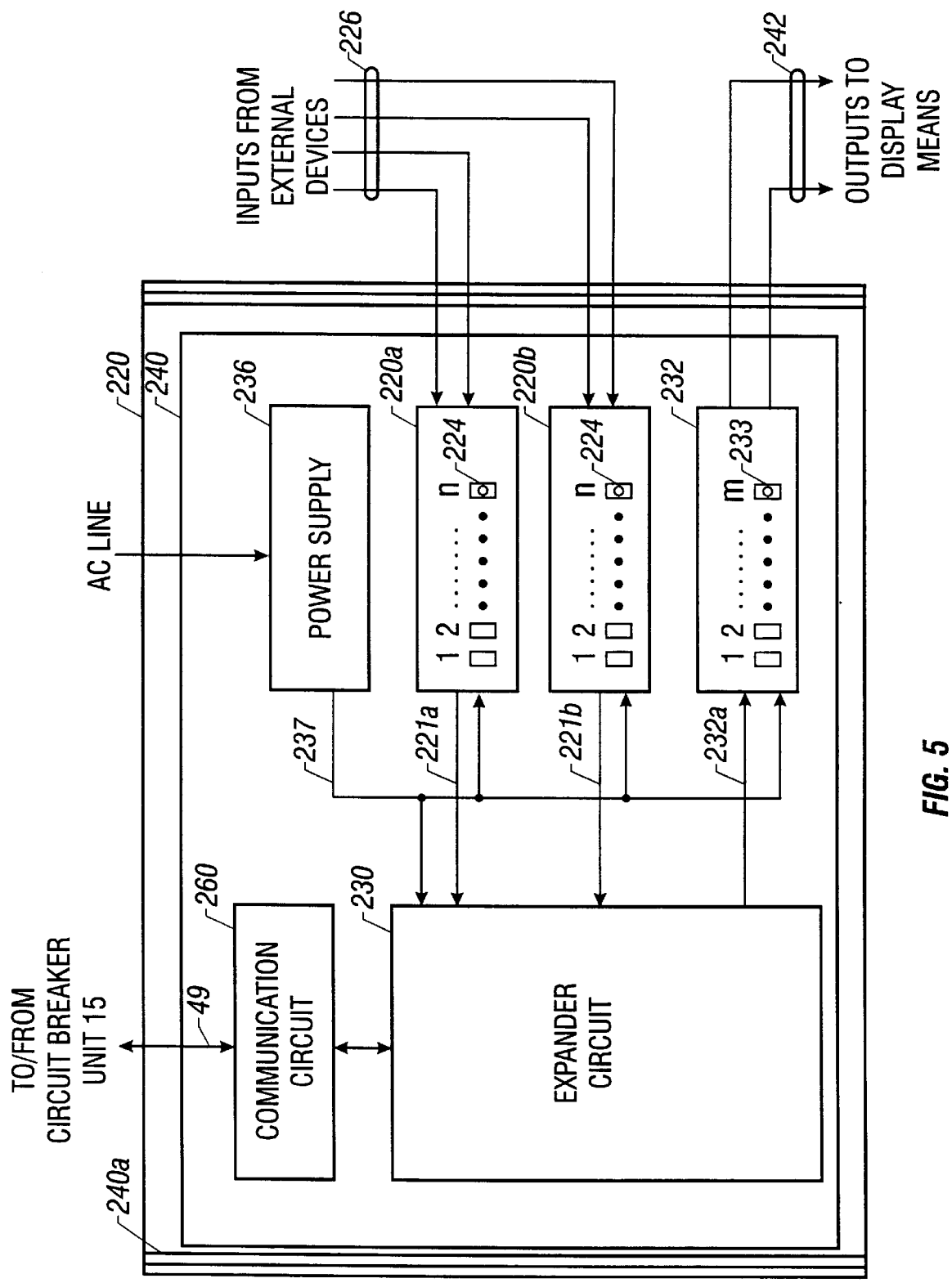
FIG. 5 shows a block diagram of the expander unit according to the present invention.

FIG. 5 shows a block diagram of the expander unit 200 according to the present invention. The expander unit 200 is placed within a suitable enclosure 220. Input terminal boards 222a and 222b, each respectively having a plurality of input terminals 224a (1-n) and 224b (i-n) thereon, are placed in the enclosure 220. The input terminals 1-n are coupled to and receive inputs from their associated external switches, such as the switches for controlling lighting in selected areas or zones in a building or from certain other selected devices, via conductors 226. An output terminal module 232, having a plurality of output terminals 233(1-m) is placed in the enclosure 220. Each output terminal may be connected to a status indicator, such as light emitting diodes (LED) via lines 242. Lines 242 may also be used to operate or drive other devices, such as relays or other equipment. Preferably, there is associated a separate status indicator for each circuit breaker 20 in the circuit breaker unit 15 for providing status of their associated circuit breakers 20 at a remote location. Typically, an LED is on when its associated circuit breaker is closed and it is off when its associated circuit breaker is open.

An expander circuit 230 for controlling the operation of the expander unit 200 and for communicating with the circuit breaker unit 15 is coupled to the input terminals 234 via conductors 221a and 221b, to the output terminals 233 via conductors 232a, and to the circuit breaker unit 15 via a communication link 49 by an RS-232 port.

A power supply 236, placed within the enclosure 220, and coupled to an external A.C. Line (typically 120 V or 227 V) provides dc power, preferably at 5 V and 24 V, to the low voltage components contained in the expander unit 200 via line 237. A class two barrier 240 shields the low voltage components from the high voltage lines in the expander unit 200. The expander unit 200 also contains a trough or gutter 240a on either side of the expander unit 200 to accommodate wires and cables to and from the circuit breaker unit 15 in a manner that enables the expander unit 200 to be installed above or below the circuit breaker. With such an arrangement, power can be supplied from either the right or left side of the expander unit 200.

Figure 6:
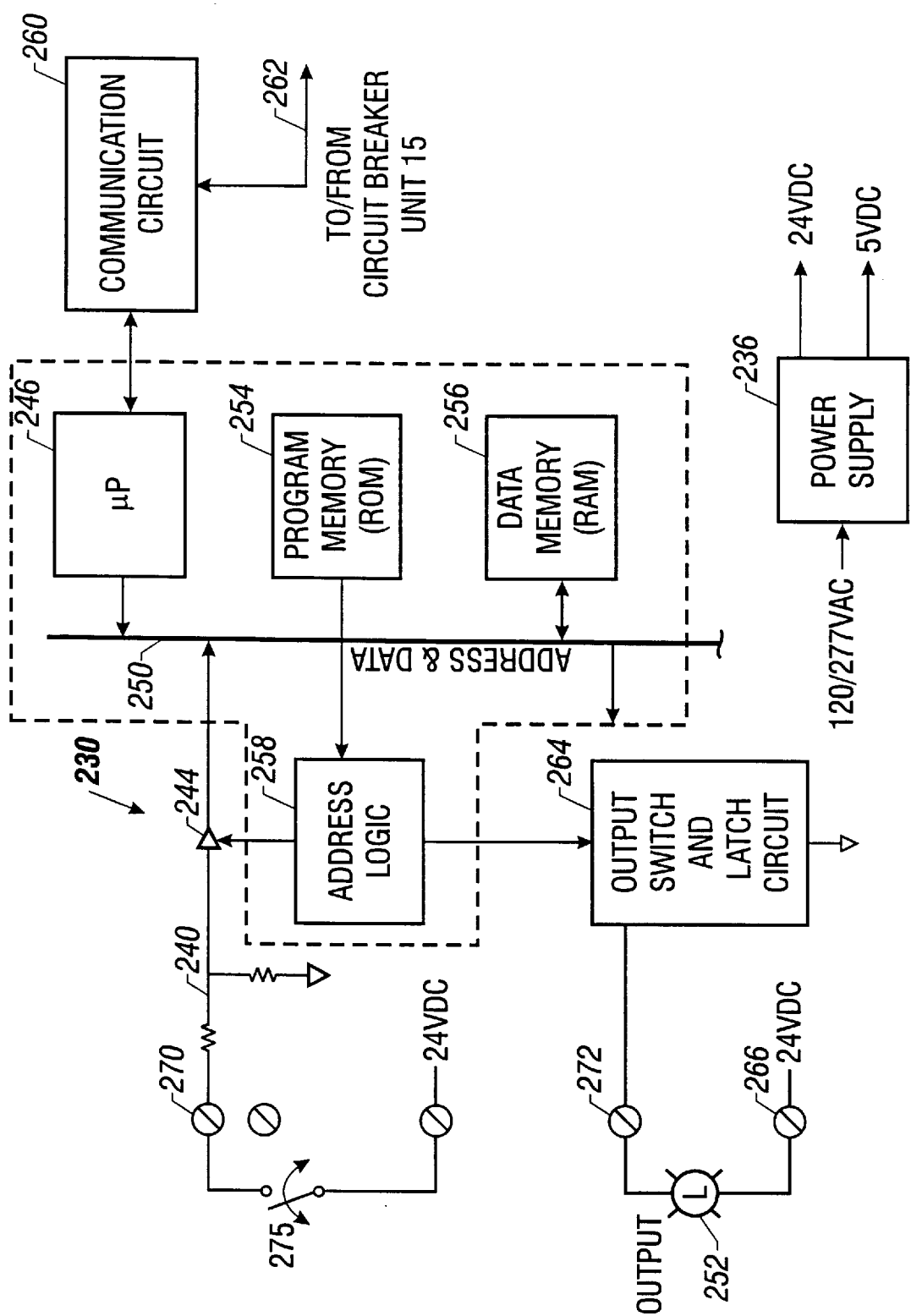
FIG. 6 shows a circuit block diagram for the expander circuit shown in FIG. 5.

FIG. 6 shows the circuit block diagram for the expander circuit 230. The expander circuit 230 contains a plurality of input circuits 270, a plurality of output circuits 272, a control/logic circuit 245 and a communications circuit. The expander circuit 230 converts the input and output signals into electronic messages to and from the circuit breaker unit 15. For simplicity, and not as a limitation, functions of the expander circuit will now be described without reference to filtering and other protection devices contained within such circuit (not shown) as they do not significantly add to the functionality of the system of the present invention.

As noted earlier, the expander unit 230 contains multiple input circuits (typically 48) and multiple output circuits (typically 42). However, for simplicity only one input circuit 270 and one output circuit 272 are shown in FIG. 6, because the remaining input circuits and output circuits are identical thereto.

Each input circuit 270 contains two separate circuits that may be logically associated with each other for the purpose of interpreting a three-wire switch 276, which is preferably used as an input terminal in the expander unit 200. Thus, in an expansion unit with 48 inputs, there will be a total of 96 input circuits. A typical input circuit contains a voltage divider 240 and an input buffer 244. An input is referred to as "on" when an externally connected device, such as a switch 275, to the input circuit 270 is closed, and "off" when it is open. In FIG. 6, the switch 275 is shown to be in the open position. The switch 275 is connected to a common low voltage line, typically 24 Vdc, which voltage also in connected to the common terminals of all of the three wire switches 276 contained in the expander unit 200.

The voltage divider 240 reduces the 24 Vdc to approximately 5 Vdc, which is the voltage used to operate commercially available buffer chips, such as the buffer 244. The output side of the buffer 244 provides a binary output state of "1" or "0," representing the state of the input. The state 1 maybe, defined as on, i.e., corresponding to. an on switch 275 and the state 0 may be defined as off, i.e., corresponding to an off switch 275 or vice versa. The buffer output is applied to a microcontroller circuit 246 via an address and data bus 250.

Each of the output circuits 272 in the expander circuit 230 essentially is an electronic switch 266 that may be turned on or turned off. A load, such as a lamp 252 or a relay or some other device, may be coupled between the 24 Vdc common low voltage and the output switch 266. An output switch and latch circuit 264 holds the derived state of the output switch 266, which is periodically updated by the microcontroller circuit 246. The output switch and latch circuit 264 contains circuitry which limits the current to output drivers contained therein that drive devices 252 and circuitry that limits the maximum current that may be supplied by the power supply.

The control and logic circuit 245 of the expander circuit 230 includes the microcontroller circuit 246, which contains a suitable microprocessor. The microcontroller circuit 246 is coupled via the address and data bus 250 to a program memory 254 (preferably ROM), a data memory 256 (preferably RAM) and an address logic circuit 258. The control and logic circuit 245 continually communicates the status of each of the input circuits 270 to the circuit breaker unit 15 via a communication circuit 260. It also continually provides signals to the output devices 252 representative of the status of their associated circuit breakers 20. The microcontroller circuit 246 executes programmed instructions (program) resident in the program memory 254. The resident program in the microcontroller circuit 246 is used to implement the operation of the expander unit 200.

The communications circuit 260 preferably includes a level translator that is used to drive a communication bus 262 coupled to the circuit breaker unit 15 via the port 40 on the interface module 24 (FIG. 2). The communication circuit 260 preferably works with a Universal Asynchronous Receiver Transmitter ("UART") to send and receive serial messages. The UART is preferably combined with the microprocessor and located within the microprocessor chips.

During operation, the microcontroller circuit 246 continually receives inputs from each of the multiple input circuits 270 and determines if there has been any change in the input status, i.e., a change from an open position to a closed position of the switch 245 or vice versa. The microcontroller circuit then implements communication to and from the circuit breaker unit 15 via the communications circuit 260. The expander circuit 230 always initializes communications with the circuit breaker unit 15. The preferred communication messages from the expander circuit 230 to the circuit breaker unit 15 are: Write Input, which is a priority message is sent as the next message after an input event occurs; Read Output State, which is a periodic message is sent at predetermined intervals, typically once per second; Read Input Type, which is a background message is sent sequentially when no other messages are pending; and Write Diagnostic Status, which also is a background message is sent sequentially when no other messages are pending.

Communication activity from the expander unit 200 to the circuit breaker unit 15 is continuous. Background messages are sent sequentially to obtain the input type configuration from and provide to the expander unit diagnostic status of the circuit breaker unit 15. An expander unit 200 having 48 input terminals will result in a "list" of 49 messages that continually repeat, one message for diagnostic status and one message for each of the 48 inputs of the expander unit 200. This allows the expander unit 200 to react to an input type change or report diagnostic errors on a periodic basis. Although the list repeats, another message may be inserted into the list. The Read output state message is inserted periodically so that the expander unit 200 has an up-to-date copy of the status of each of the circuit breakers 20. This status is likewise periodically written to the latch in the output switch and circuit 264. The Write Input message has the highest priority and is inserted as the next message. This is to provide quick response of the circuit breaker unit 15, when a switch 245 is opened or closed.

A priority Write Input message is generated as a result of a series of events. First, if there is a physical change of state at one of the input circuits 270. This change is detected as the microcontroller circuit 246 performs its periodic polling of all input circuits 270. Any new state of the input is interpreted into either an "on" or "off" signal. This requires the Input Type setup information that was read from the circuit breaker unit 15 (for example, momentary push-button switches toggle the state on each momentary closure, but maintained switches are on when closed, and off when open). After interpretation occurs, the Write Input message is built that contains the input number and the new state, and the communications task is signaled that a priority message is ready.

The expander unit's communications port is connected to the expander port on the circuit breaker unit 15. The microprocessor 72 in the Interface Module 24 (FIG. 3) provides communications at this port. It reads and writes the status as requested. In the event of a Write Input message, bits are set inside the Interface Module 24 to record the input state sent from the expander unit 200, as well as the fact that a transition has occurred. This will trigger the breaker control task that will match the input to the list of individual circuit breakers 20 that are affected by that input. Circuit breakers 20 will turn on or off as programmed in the circuit breaker unit 15, which program includes turning on and off the circuit breakers as a function of the status of the input switches 270, which in turn depends upon the status of devices connected thereto.

In summary, the circuit breaker unit 15 controls the operation of the various circuit breakers 20 in accordance with the programmed instructions contained in the circuit breaker unit or received from a remote device. An expander unit that is external to the circuit breaker unit continually communicates to the circuit breaker unit 15 the status of a plurality of switches 270 or other devices and in response thereto the circuit breaker unit 15 controls the operation of the circuit breakers in accordance with the programmed instructions. The expander unit 20 continually receives signals from the circuit breaker unit 15 that are representative of the status of the individual circuit breakers and displays such status at a remote location and/or activates or operates other devices as a function of the status of the circuit breakers.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A circuit arrangement for use with an electrical distribution unit used to control current paths through a plurality of associated electrical switching devices, each such switching device operable in an open position and a closed position:
- (a) a plurality of input circuits, each said input circuit adapted to be coupled to an associated external element having an on state and off state, each said input circuit generating signals representative of the on state and the off state of its associated external element;
- (b) a control and logic circuit coupled to the electrical distribution unit and the input circuits for receiving therefrom digital signals representative of the on and off states of the external elements associated with said input circuits, said control and logic circuit continually providing digital signals representative of the on and off states of the external elements to the electrical distribution unit to operate the switching devices between their respective open and closed positions corresponding to the on and off states of the external elements, said control and logic circuit receiving from the electrical distribution unit digital signals for each of the switching devices which are representative of the open and closed positions of each such switching devices; and
- (c) a separate output terminal corresponding to each of the switching devices in said plurality of switching devices coupled to the control and logic circuit for receiving therefrom digital signals representative of the open and close position of their corresponding switching devices.

2. A circuit arrangement for use with an electrical distribution unit used to control current paths through a plurality of associated electrical switching devices, each such switching device operable in an open position and a closed positions, comprising:
- (a) a plurality of input terminals, each said input terminal adapted to be coupled to an associated external element having an on state and an off state;
- (b) a control and logic circuit coupled to the electrical distribution unit and the input terminals receiving therefrom digital signals representative of the on and off states of the external elements to the electrical distribution unit for the electrical distribution unit to operate the switching devices between their respective open and closed positions as a function of the on and off states of the external elements, said control and logic circuit receiving from the electrical distribution unit separate digital signals for each of the switching devices which are representative of the open and closed positions of each such switching devices; and
- (c) a separate display device corresponding to each of the switching devices in said plurality of switching devices coupled to the control and logic circuit for receiving therefrom signals representative of the open and close positions of their corresponding switching device and in response thereto indicating the open and close status of their associated switching device.

3. An electrical distribution system, comprising:
- (a) a circuit breaker enclosed in a load panel having a plurality of circuit breakers, each said circuit breaker operable in an open and closed position, said circuit breaker unit further having an interface module coupled to each of the circuit breakers, said interface module causing the circuit breakers to operate between their respective open and closed positions in response to programmed instructions; and
- (b) an expander unit external to the load center panel and electrically coupled to the interface module, said expander unit providing signals to the interface module representative of an on state and an off state of a plurality of external devices for the interface module to cause the circuit breakers to operate between their respective open and closed positions as a function of the on and off states, said expander unit receiving signals from the interface module representative of the open and close position of the circuit breakers and in response thereto causing a display device to separately indicate the open and closed position of each of the circuit breakers.

4. A circuit breaker unit, having a panel board with a plurality of power lines connected to an external power source, connected to an expander unit that provides digital signals to the circuit breaker unit on the status of external devices, comprising:
- (a) a plurality of remotely controllable circuit breakers;
- (b) a control module;
- (c) an interface module;

each of the remotely controllable circuit breakers being capable of interrupting the flow of electricity through an associated power line; the interface module being connected to the control module, the expander unit and the circuit breakers; the interface module being capable of causing the circuit breakers to open and close according to instructions received from the control module and having the capability of sending a digital signal to the control module indicating the status of each of the circuit breakers and of status signals received from the expander unit; and the control module being capable of sending instructions to the interface module to open and close the circuit breakers according to programmed instructions stored in the control module, the status of each of the circuit breakers and the status signals received from the expander unit.

5. The circuit breaker unit of claim 4 wherein the programmed instructions are stored in the control module on a memory selected from (i) an Electrically Erasable Programmable Read Only Memory (EPROM), (ii) a random access memory (RAM), and, (iii) a read only memory (ROM).

6. The circuit arrangement of claim 1 wherein the switching devices are circuit breakers, further comprising a bus board for mounting the circuit breakers thereon.

7. The circuit arrangement of claim 1 wherein the electrical distribution unit receives signals from control and logic circuit by means of a data port.

8. The circuit arrangement of claim 1 further comprising a data multiplexer for multiplexing of signals between the control and logic circuit and the electrical distribution unit.

9. The circuit arrangement of claim 2 wherein the switching devices are circuit breakers, further comprising a bus board for mounting the circuit breakers thereon.

10. The circuit arrangement of claim 2 wherein the electrical distribution unit receives signals from control and logic circuit by means of a data port.

11. The circuit arrangement of claim 2 further comprising a data multiplexer for multiplexing of signals between the electrical distribution unit and the control and logic circuit.

12. The electrical distribution system of claim 3 further comprising a bus board for mounting the circuit breakers thereon.

13. The electrical distribution system of claim 3 wherein the expander unit sends signals to the load center panel by means of a data port.

14. The electrical distribution system of claim 3 further comprising a data multiplexer for multiplexing of signals between the expander unit and the load center panel.

15. The circuit breaker unit of claim 4 further comprising a bus board located within the panel board for mounting the circuit breakers thereon.

16. The circuit breaker unit of claim 4 further comprising a data port for providing communication between the expander unit and the circuit breaker unit.

17. The circuit breaker unit of claim 4 further comprising a data multiplexer for multiplexing of signals between the expander unit and the circuit breaker unit.

18. The circuit breaker unit of claim 4 further comprising a communications circuit in the expander unit, said communications circuit adapted to work with a Universal Asynchronous Receiver Transmitter to send and receive serial messages.

19. The circuit breaker unit of claim 4 wherein communication activity from the expander unit to the circuit breaker unit is continuous.

20. A method of controlling power to a plurality of power lines connected to an external power source comprising:

(a) connecting a circuit breaker unit, having:
  (i) a panel board with a plurality of remotely controllable circuit breakers each of the remotely controllable circuit breakers being capable of interrupting the flow of electricity through an associated the power line,
  (ii) a control module; and
  (iii) an interface module;
  to the plurality of power lines;

(b) connecting an expander unit to the circuit breaker unit, (c) providing from the expander unit to the circuit breaker unit digital signals on the status of external devices;

(d) connecting the interface module to the control module, the expander unit and the circuit breakers, the interface module being capable of causing the circuit breakers to open and close according to instructions received from the control module;

(e) sending from the interface module to the control module a digital signal indicating the status of each of the circuit breakers and of status signals received from the expander unit; and (f) sending instructions from the control module to the interface module to open and close the circuit breakers according to programmed instructions stored in the control module, the status of each of the circuit breakers and the status signals received from the expander unit.

* * * * *